Nov. 15, 1932.  E. ALTENKIRCH  1,887,957
ABSORPTION REFRIGERATING MACHINE
Filed June 8, 1929
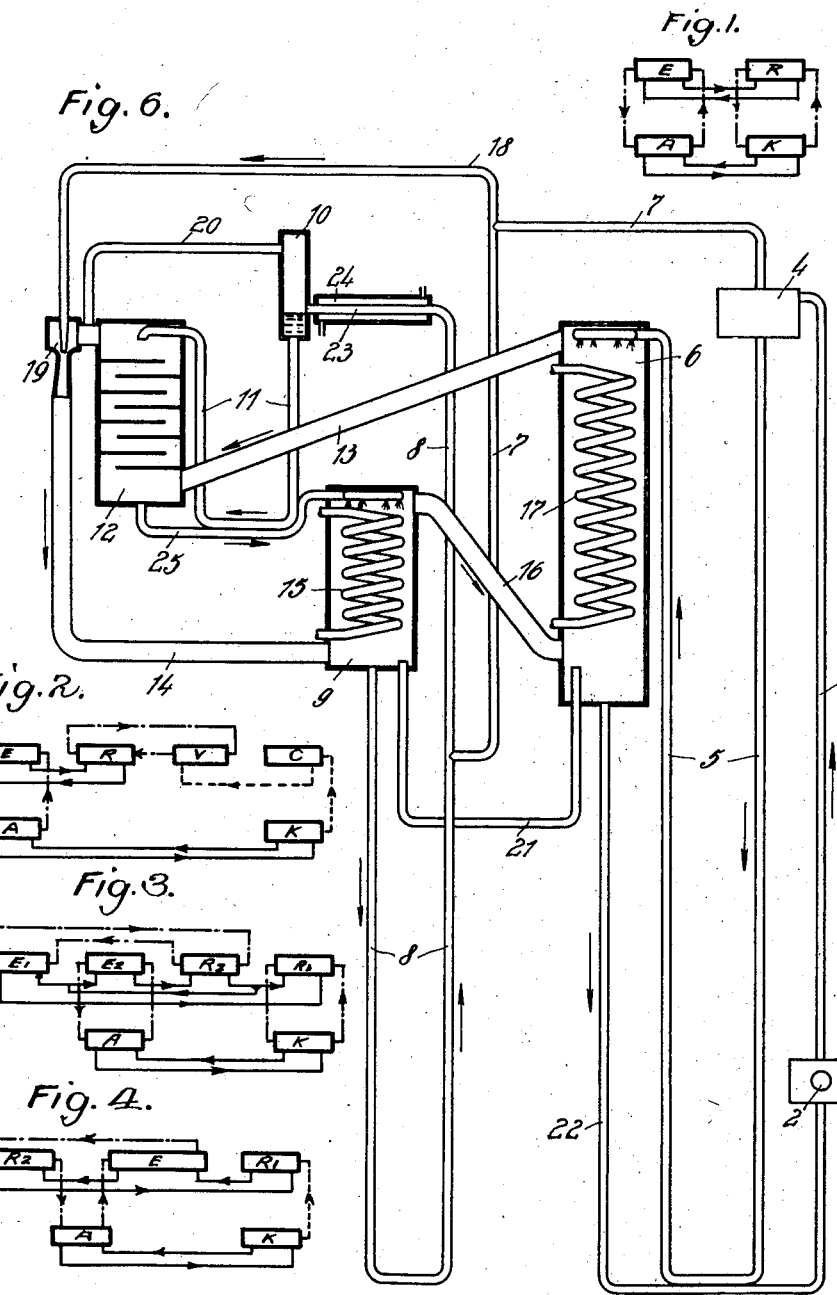

Patented Nov. 15, 1932

1,887,957

UNITED STATES PATENT OFFICE

EDMUND ALTENKIRCH, OF NEUENHAGEN, NEAR BERLIN, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY

ABSORPTION REFRIGERATING MACHINE

REISSUED

Application filed June 8, 1929, Serial No. 369,358, and in Germany June 16, 1928.

My invention relates to improvements in absorption refrigerating machines.

Absorption machines are already known in the art in which the pressure difference between evaporator and absorber on the one hand, and between the generator and the condenser or resorber on the other hand, is compensated to a greater or smaller extent by admixture of an inert gas. The inert gas was naturally only added to the gas space, which comprises the evaporator and absorber, while the vapor spaces, in which the working medium is expelled and condensed, remained free from the inert gas. The absorption solutions as well as the admixed gas are in this process circulated in closed cycles.

The present invention refers to an absorption machine of the aforementioned character, in which the expelled gaseous working medium is returned into its liquid phase in a resorber and reevaporated from the absorption solution in an evaporator. However, in contradistinction to absorption machines of this type heretofore known, the gaseous working medium is absorbed also in the resorber at least in part in the presence of a neutral or inert gas. By this expedient the system is freed from several limitations to which absorption machines which use a neutral gas mixture are subject, and by which the system can be adapted more readily to a greater variety of requirements in practice. The difference between the system according to the present invention and the known absorption machines which use an admixture of a neutral gas may also be expressed as follows: While in the prior art absorption machines, the absorption solution from which the gaseous operating medium is evaporated into the neutral gas, has a concentration, respectively a concentration range different from the absorption solution by which the operating medium is absorbed from the gas mixture, the present arrangement uses an absorption solution of the same concentration range for both functions. On the other hand, the temperature range and the partial pressure zone in which the evaporation of the working medium from the absorption solution into the neutral gas occurs, and at which the absorption from the gas mixture into the solution occurs, are different for the two functions.

The admixture of neutral gas in the resorber has first of all the effect that the temperature range within which the absorption heat of the resorber is liberated is not only dependent upon the pressure and the change in concentration, as is also the case in the prior art absorption machines, but it is dependent also upon the quantity of the neutral gas circulating through the resorber. Therefore, this temperature range can be chosen within very wide limits by correspondingly determining the intensity of the gas circulation. If, in such a case, the mean temperature of the resorber is not much higher than that of the evaporator in which the absorption solution enriched in the resorber is reevaporated, and if only a comparatively small amount of absorption solution is allowed to circulate between the resorber and the evaporator, the resorber may be included into the circulation of the neutral gas between the evaporator and the absorber, preferably so that the gas mixture discharged from the evaporator traverses first the resorber and then the absorber. The gas mixture circulation can in such a case be brought about with well known means, so that additional means for effecting the neutral gas circulation through the resorber are not necessary.

The further range of use, the advantages and additional new features involved in the invention will be more fully described in the following specification with reference to the accompanying drawing, in which a number of different arrangements according to the invention are shown, partly only schematically, and partly in a form approaching that of a practical form.

In all figures of the drawing it is clearly shown how the different vessels involved in the system are connected by liquid and gas conduits.

In the drawing

Fig. 1 schematically illustrates an absorption machine in which one absorber and one evaporator are combined into a gas mixture circulating system, and one resorber and one generator are combined to form another gas mixture circulating system;

Fig. 2 shows schematically an absorption refrigerating machine in which the medium vapor developed in the generator passes first into a condenser, and the condensate passes into a primary evaporator, and in which this primary evaporator and a resorber on one hand, and the absorber and a secondary evaporator on the other hand, are combined into two separate gas mixture circulating systems.

Fig. 3 shows schematically an absorption refrigerating machine having a generator, an absorber, and two resorbers, and two evaporators, and in which one resorber is combined with the generator, the other resorber with one of the two evaporators, and the other evaporator is combined with the absorber, each of the aforementioned combined pairs of vessels forming separate gas mixture circulating systems;

Fig. 4 schematically shows an absorption refrigerating machine, having a generator, two resorbers, one evaporator and one absorber, and in which the evaporator is combined with the two resorbers into one circulating system for the absorption solution, and the absorber, together with the evaporator and one of the two resorbers, forms a circulating system for the gas mixture;

Fig. 5 schematically shows an absorption refrigerating machine which contains the same kind and number of vessels as Fig. 4, in which however all vessels are combined to form one single liquid circulating system, but in which as in Fig. 4 the absorber, together with the evaporator and one of the resorbers, forms a single gas mixture circulating system; and Fig. 6 shows the absorption refrigerating machine shown in Fig. 4 in an arrangement in which the different vessels and their connection approach more closely the practical form of such a machine.

In the purely schematic illustrations Figs. 1 to 5, the liquid conduits are represented by solid lines, the pure gaseous medium conduits by dotted lines, and the gas mixture by dash and dot lines.

The principle involved in the present invention can be explained in very simple manner with the aid of schematic illustration Fig. 1.

Referring to this figure the reference letter K indicates the generator, A the absorber, R the resorber and E the evaporator. The circuits of the liquids are indicated by thin solid lines, the circuits of the gas mixtures by lines in dashes and dots. The direction of flow is shown by arrow heads. As solvent may, for instance, be assumed sulphuric acid, as working medium water and as inert gas in the generator and resorber nitrogen and in the evaporator and the absorber hydrogen. The sulphuric acid absorption solution extensively freed from the water flowing from the generator K to the absorber A interchanges its heat with the solution enriched by working medium flowing from the absorber to the generator. The enriched solution flowing from the resorber to the evaporator is likewise in heat interchange with the solution returning from the evaporator into the resorber. The indication of the heat interchange in the circulation systems of the gas mixture has been omitted in the drawing for the sake of simplification.

Such a system operates in the following manner. By the application of heat to the watery sulphuric acid solution in the generator K steam is developed and discharged into the admixed nitrogen. The sulphuric acid concentrated by the evaporation then reaches the absorber A. The nitrogen containing mixture heated by the contact with the solution in the generator and having also become lighter by having taken up steam ascends into the resorber R located at a higher level and there gives off the steam taken up in the generator to the only slightly concentrated sulphuric acid solution coming from the evaporator. The heat of absorption generated is discharged by cooling water or air. The gas mixture more or less freed of steam returns into the generator, and the sulphuric acid diluted by the absorption of water vapor passes into the evaporator E, where it gives off the absorbed steam to the admixed hydrogen under a corresponding production of cold. The hydrogen gas mixture thus becomes heavier and sinks down into the absorber A, where the steam is absorbed by the concentrated sulphuric acid coming from the generator K, heat being set free, which is again to be discharged by cooling water or air. The hydrogen gas mixture freed of steam and heated in the absorber ascends again into the evaporator. The solutions and the gas mixtures flow in opposite directions in all the vessels.

The total pressure may be different or the same in the two gas mixture circulating systems. If the total pressure is different, this difference in pressure could be maintained in well known manner for instance by liquid columns. For instance, in case of a desired lower pressure in the absorber, the latter would be placed higher than the generator, and in case a lower pressure is desired in the evaporator, the latter would be placed higher than the resorber. The entire system is, however, simplified if the same kind of neutral or inert gas is used in the several gas mixture circulating systems, and if the total pressure in the several systems is maintained equal. Also in this case the gas mixture circulation in each of the two systems may be maintained with well known means and without difficulty.

Machines of the type described are entirely free from any restriction in regard to the choice of the pressure. Machines with sulphuric acid as solvent and water as working medium may equally well be operated with, for instance, a total pressure of 0.1 or 0.2 atmosphere absolute, as at atmospheric pressure or at a pressure above the atmospheric, and without the necessity of burdening the system with any moving parts or great heights of structures. For the greatest possible economy in external operating heat supply an increase of the pressure must be presumed as will now be shown.

So far it was assumed that the gaseous working medium, which is absorbed from the gas mixture by the solution in the resorber R at the partial pressure determined by the temperature and which re-evaporates from the solution in the same concentration range into the gas mixture in evaporator E in a zone of low partial pressure, has been generated in the generator K and introduced into the gas mixture at a pressure corresponding with the partial pressure of the resorber R. The scope of utility of the invention is, however, still further increased, if in the absorption machine a third (higher) pressure or partial pressure zone is provided, at which the working medium is evaporated and condensed. The condensation may take place in this zone of highest pressure either by pure condensation or by absorption in a solution, and this zone may either be excluded from the admixture with the inert gas or it may be allowed to partake in such admixture.

By the addition of the third pressure zone various substantial improvements are attained, which will now be described with reference to the remaining diagrams. Referring first to Fig. 2, one of these improvements consists in deriving the working medium, which in Fig. 2 is supplied to the resorber R in contact with the neutral gas for the purpose of subsequent re-evaporation in the evaporator E, not from the generator K, but from a primary evaporator V charged with the condensate of the higher pressure stage, in which it has already produced cold once, so that the working medium evaporated by a definite expenditure of heat produces cold twice. The refrigerating capacity of the machine can thus be increased considerably.

The solution of equal concentration range then performs a cycle, in which it passes in succession into the temperature range of the production of cold (evaporator E) and into the temperature range of the heat discharge to the surroundings at a mean temperature (resorber R), and thus comes twice in contact with the neutral gas, which is characteristic of the present invention. The working medium, which for Fig. 2 and the embodiments illustrated in the subsequent figures is assumed to be ammonia and the solvent as water, is evaporated in the generator K by the application of heat, passes as vapor or steam (dotted line) into the condenser C, is there condensed under discharge of heat and then passes (dashed line) into the primary evaporator V, where it evaporates into the gas mixture circulating (dash-dot line) between the resorber R and the primary evaporator V under production of cold in the latter. From this gas mixture the working medium is again absorbed in the resorber R, under renewed discharge of absorption heat by the resorber. The solution thus enriched circulates between the secondary evaporator E and the resorber R. In evaporator E it is, under renewed production of cold, evaporated into the gas mixture circulating between the evaporator E and the absorber A. Finally it is again absorbed in the absorber A from the latter gas mixture by the solution circulating between the generator K and the absorber A under discharge of heat from the absorber.

It is not necessary that the solution, as assumed in the examples mentioned, returns immediately from the chamber, in which it has absorbed working medium from a gas mixture, into the chamber in which the absorbed working medium again evaporates from the same concentration range of the solution into gas mixture. It is quite possible and assists in the simplification of the circulation of the liquid, to pass the liquid from the chamber in which it has absorbed working medium within a medium partial pressure zone into a chamber in which it continues to absorb working medium within the same temperature range, but at higher pressure or partial pressure. The thus more strongly concentrated solution then first passes into the chamber where it gives up working medium to gas mixture in a range of low temperature and in the medium partial pressure zone, and finally reaches the chamber, where it gives off further working medium to gas mixture in the concentration range corresponding with the gas absorption in the first chamber. More generally expressed the cycles of circulation of the liquids may be so combined, that all three partial pressure zones are traversed by the solution which circulates between two temperature ranges.

Fig. 3 of the drawing shows an example of this system, ammonia being assumed as working medium, water as solvent and nitrogen as inert gas in all three gas cycles of circulations. The gas circulation systems may be equalized in pressure by interconnecting means. In the drawing these interconnections have again been omitted for the sake of simplicity. The ammonia expelled in the generator K by the application of heat passes by the agency of a gas circulation into the resorber $R_1$. In the latter the working medium is absorbed by a solution, which first passes into the evaporator $E_1$, which by a gas circulation system communicates with the resorber $R_2$. The working medium converted into vapor in the evaporator $E_1$ is again absorbed by the solution flowing through the resorber $R_2$. The solution in the latter resorber is able to do this, since after traversing the evaporator $E_1$ it first passes into the evaporator $E_2$, where by means of a gas circulation connected with the absorber A it is freed of gas to a large extent at a low partial pressure, so that it enters the resorber $R_2$ at a low concentration. From the resorber $R_2$ the solution returns into the resorber $R_1$, where at the partial pressure generated in the generator K it receives the strong ammonia concentration, which enables it to produce cold already in the evaporator $E_1$ at the medium partial pressure of the resorber $R_2$.

A pressure may prevail in the entire machine considerably lower than that which corresponds with the vapor pressure of the pure ammonia. This pressure may, on the other hand, be substantially exceeded. Particularly when a high pressure prevails in the machine it may be necessary to make the quantity of the solution circulating between the resorber $R_1$ and the evaporator $E_1$ smaller than the quantity of solution circulating between the resorber $R_2$ and the evaporator $E_2$. By a branch leading from the pipe connecting resorbers $R_2$ and $R_1$, to the pipe which connects evaporators $E_1$ and $E_2$, shown in Fig. 3, it is indicated how this requirement may be met in a simple manner. By this aforementioned branch a portion of the solution then returns into the evaporator $E_2$ immediately after it leaves resorber $R_2$, while the remaining portion of the solution traverses also the resorber $R_1$ and the evaporator E. This remaining portion of the solution thus circulates through all three partial pressure ranges, between the medium and the low temperature range. This branch current may without difficulty be allowed to participate in the heat interchange of the solutions, not shown in these diagrams, but which is preferably provided between the solution which flows from the resorber $R_1$ to the evaporator $E_1$ and that which flows from the evaporator $E_2$ to the resorber $R_2$.

The same as the liquid cycles of circulation also the two separate gas mixture cycles in Fig. 3, namely that between the range of the medium and that of the low temperature may be combined into a uniform gas mixture circulation. Independently thereof a combination of the evaporator $E_1$ with the evaporator $E_2$ is also possible, since in the case of separate gas circulations the point at which $E_1$ passes directly into $E_2$ merely represents the interconnection for the pressure equalization of the gas circulation systems. If both combinations, viz. that of the liquid and that of the gas mixture circulations, are employed and the gas admixture in the range of the highest pressure is omitted, that is between the generator K and the resorber $R_1$, a particularly simple embodiment of my invention is obtained, which is illustrated in Fig. 4 of the drawing. From the solution circulating between the absorber A and the generator K the ammonia is expelled in the generator K by the application of heat, and passes into the resorber $R_1$, (dotted line) where it is absorbed by a solution, which has already absorbed ammonia from gas mixture in the resorber $R_2$. The solution thus further enriched in the resorber $R_1$ passes into the evaporator E which is shown comparatively long in order to indicate the combination of two evaporators. The solution, after being extensively freed in this evaporator from operating medium, which evaporates into the gas mixture coming from the absorber A, now passes into the resorber $R_2$, where it again absorbs working medium from the gas mixture, and thence returns into the resorber $R_1$, where the further concentration takes place in the absence of inert gas, and to commence its cycle anew. The gas mixture arrives in evaporator E from absorber A with low ammonia partial pressure, assumes in the evaporator E an ammonia partial pressure, which when the mixture leaves the evaporator corresponds with the mean partial pressure zone, and then gives off a portion of its admixed working medium in the resorber $R_2$ into the solution contained therein and loses the remainder of the medium in the absorber A in the low partial pressure zone into the impoverished solution coming from the generator K. In the absorber A and the resorbers $R_1$ and $R_2$ it is necessary to discharge heat. In the evaporator E the cold is produced.

The machine, which is only schematically illustrated in Fig. 4 of the drawing, is shown in Fig. 6 in a structural form which approximates more or less its actual execution, so far as the relative location of elements and their general structural character and physical connection is concerned. The ammonia, expelled from an aqueous ammonia solution in the generator, boiler or still 1 by means of a heating element 2, ascends in the pipe 3 in gaseous form together with the weak solution into the gas separator or rectifier 4, which is located at such an elevation that the discharge of the solution through the pipe 5 into the absorber 6 already commences before the pressure necessary for operating nozzle 19 exists. The solution returning from the absorber 6 through the pipe 22 into the generator or boiler 1 forms together with the pipe 5 a heat interchanger. The expelled gaseous ammonia separates in the gas separator 4 from the solution and passes through the pipe 7 into the rising leg of the U-shaped pipe 8 coming from the gas filled resorber 9, terminating in this pipe 8 at a level, which on the one hand suffices for creating an appreciable liquid head in pipe 8 above this entry point to raise by the gas from pipe 7 the liquid in pipe 8 in the direction of the arrow, from the level of resorber 9, and on the other hand the liquid pressure at this level creates the back pressure necessary for operating nozzle 19.

The gaseous working medium thus raises the solution coming from the second resorber 9 ($R_2$ in Fig. 4) into the first resorber 23 ($R_1$ in Fig. 4) not participating in the gas mixture circulation, this latter resorber being cooled by a cooling jacket 24. The gaseous medium thus first raises the solution to this resorber and is absorbed by this solution when the latter reaches the resorber 23. The absorption solution enriches in this way passes into the gas separator 10, in which any non-absorbed residues of gas are able to separate from the liquid, and then flows through the pipe 11 into the evaporator 12, in which the cold is generated by evaporation of the medium, the vapor now passing into the circulating gas mixture supplied through pipe 13. The absorption solution, which has been greatly impoverished in the evaporator 12 then flows through a pipe 25, which with the pipe 11 forms a heat interchanger, into the second resorber 9, in which it flows over the pipe coil 15 traversed by cooling water, is cooled thereby and absorbs working medium from the circulating gas mixture. This mixture is supplied in counter flow from the evaporator through pipe 14, and circulated by the gas jet 19 supplied with pure gas through pipe 18 directly from gas separator 4, and operating in well known manner. The further concentration of the solution then takes place in the resorber 23, as already described. The gas mixture, partially freed from working medium in the resorber 9 participating in the gas mixture circulation, flows thence through pipe 16 into the absorber 6, in which the absorption solution drips down over the pipe coil 17 traversed by cooling water. The gas mixture ascends in the absorber 6 in counter-flow to the absorption solution and gives off further working medium to the cooled absorption solution. The gas mixture extensively freed from working medium now flows through the pipe 13 into the evaporator 12, enters at the bottom, and rises in counterflow to the rich solution dripping down in the evaporator, until it is conveyed into the pipe 14 by means of the nozzle 19, and the cycle is renewed. Pipe 18 which supplies jet 19 with fresh gas branches from pipe 7 at such a height, that when the machine is stopped and a vacuum is set up in the gas separator 4 inert gas is able to return through the nozzle rearwards into the gas separator 4, whereby it is prevented, that liquor returns from the resorber system into the absorber system, which would cause an undesirable extension of the starting time of the machine. Gas residues, which have not been absorbed in the resorber 23, are conducted to the gas mixture pipe 14 through the pipe 20. This is particularly suitable, because this surplus gaseous working medium can thus already be absorbed in the resorber 9 and is thus able to assist in the output of cold. The nozzle 19 is for this reason also located in the pipe 14 leading from the evaporator to the resorber 9, so that the gas employed for bringing about the gas circulation is not lost for the refrigerating action. By the gaseous working medium and by the gas mixture circulation small quantities of the solvent are entrained from the absorber system into the resorber system. In order to return these surplus quantities in the resorber system into the absorber system a pipe 21 is provided leading from the resorber 9 into the absorber 6. It would, furthermore, be of advantage to precool the gas mixture flowing through the pipe 13 from the absorber 6 to the evaporator 12 by the gas mixture flowing in the pipe 14 from the evaporator 12 to the resorber 9, and this heat interchanger should preferably be located in front of the diffusor appertaining to the nozzle 19. For the sake of simplifying the drawing this heat interchanger has been omitted in Fig. 6. For the same reason other improvements known in the art of operating absorption machines have been omitted, such as the rectification of the expelled working medium by the strong solution flowing into the generator or boiler, as well as by the solution returned by means of the scavenging pipe 21, since their application to machines according to my invention does not embody any novel features.

The greatest simplification for carrying out the liquid circulation occurs, of course, when all the cycles of liquid circulation in the machine are combined into a single cycle of liquid circulation. Fig. 5 of the drawing illustrates schematically such a machine destined for an increased cold output without neutral gas admixture in the generator K and in the resorber $R_2$ of the high partial pressure stage, but with a uniform gas mixture circulation through the evaporator E, the resorber $R_1$ of the mean partial pressure stage and the absorber A. The absorption solution flows here from the generator K first to the absorber A, thence into resorber $R_1$ having mean partial pressure, thence into resorber $R_2$ having high partial presure, and which resorber receives pure gaseous working medium from the generator, thence into the evaporator E and finally back into the generator K. The generator K and the resorber $R_2$ may then without difficulty stand under higher pressure than the other vessels containing inert gas. The pressure difference may be maintained by hydrostatic columns and the pressure difference may be utilized to bring about the circulation of the gas mixture by introducing a portion of the gas expelled in the generator K into the pipe leading from the evaporator E into the resorber $R_1$. The absorber A and the resorber $R_1$ may easily be combined into a common vessel. In order that the intended success of the saving of heat may be realized in the practical execution of this refrigerating machine it is necessary to fulfill a number of conditions, disregard of which would render the output of the machine unsatisfactory.

Above all it is again necessary to provide an efficient heat interchange between the circulating absorption solutions and the gas mixture, further, care must be taken by suitable interconnections that considerably less solution circulates through the evaporator E and the two resorbers $R_1$ and $R_2$ than between the generator K and the absorber A. Under certain working conditions it is, furthermore, advantageous to subdivide also the solution, which flows through the evaporator E and the resorbers $R_1$ and $R_2$ by means of interconnections in such a manner, that within the range of the stronger concentration of the solution a smaller quantity circulates. Finally the gas circulation may by transverse connections be quantitively adapted to the prevailing demand in the various partial pressure zones. All the necessary sizes and quantities may be calculated from the data available in the literature of the art, so that further explanations appear unnecesary.

From the preceding explanations and the examples illustrated it will be understood that the gas circuits may either individually or in groups be united to a common circuit through various absorption or evaporation chambers. If three pressure zones exist of which only the zone of the lowest and that of the medium partial pressure participate in the gas mixture circulation, two gas mixture currents are necessary in case of the reduction of the evaporation heat, of which one circulates between the absorber and one portion of the evaporator, and the other between the other portion of the evaporator and one portion of the resorber. This case is illustrated in Fig. 2 of the drawing. The two separate gas circuits may, however, also be combined into a single circuit, which then comprises two different partial pressure zones, regardless whether simultaneously the cycles of liquid circulation are combined or not. This case is illustrated in the Figs. 4 and 6 as well as in Fig. 5.

In the designs according to Figs. 1 and 3 a gas circulation takes place between a chamber to which heat is supplied at a high temperature and a chamber in which heat is discharged at a medium temperature.

In all modifications aforedescribed, where a separate cycle is provided for the strongest concentrated solution the enrichment with working medium during the condensation in the range of the strongest concentration may attain such a degree, that the circulation of the solution within this concentration range may be omitted and the total non-evaporated liquid may be conducted into a solution circulating in another concentration range, preferably the adjacent concentration stage. Since by this provision the highest pressure is attained, which is attainable at all with the working liquid at disposal, it is with this arrangement easily possible to provide three partial pressure zones and thus to effect a great saving in evaporation heat. This condition exists in the arrangement illustrated in Fig. 2 of the drawing.

For bringing about the desired effect it is not absolutely necessary, that the gas mixture should circulate in counter-flow to the solution in all chambers in which the working medium evaporates out of the solution into gas or is absorbed by the solution from the gas mixture. The counter-flow brings about a considerable improvement, however, particularly in cases in which the temperature ranges should not be too extensive, so that it is advisable to make use of it wherever possible.

For a satisfactory operation of the machine a gas mixture circulation is necessary, which is as closely as possible adapted to the liquid circulation and to the output. To realize this condition there are primarily available the differences in the specific weights of the columns of gas mixture, which may be attained by arranging the individual vessels separately. Since this effect is, however, not always uniform and cannot be accurately calculated in advance, it is advisable to blow gaseous working medium developed under comparatively high pressure into the gas mixture circuit by means of a nozzle. If the entire generator is filled with gas, it is not possible to bring about a pressure above atmospheric in it, in order to cause the circulation of the gas in the manner stated. A special heating place must therefore be provided in order to develop working medium under exclusion of the admixed gas under higher pressure and higher temperature, to introduce it into the nozzle and the circulation system. Also in this case the vapor generated for the nozzle is not lost, but is fully utilized for the production of cold, when the vapor, as already pointed out with reference to Fig. 6, is introduced into the gas circulation system in such a manner that it first reaches the resorber together with the gas mixture. The vapor developed for bringing about the gas circulation is then completely absorbed in the resorber, so that no loss ensues. It is thus possible to increase the driving power for the gas circulation almost to any extent desired or to reduce the pipe cross-sections considerably, without taking losses of any other kind into the bargain.

For the cycle of the absorption solution the hitherto known means may be employed, as far as they are suitable. In the case of gas admixture in the generator and resorber the application of these means is, however, rendered somewhat difficult.

A cycle of circulation due to the different specific weights of the strong and the weak solution comes about, if the pressure in the chambers where working medium under high pressure is absorbed out of the gas mixture, is higher than in the chambers, where the working medium again evaporates from the solution into the inert gas, and if this pressure difference is maintained by columns of liquid. Where, however, common gas cycles exist it is not possible to maintain such a pressure difference. To cause the desired circulation it is then possible to connect the individual vessels in which the gas interchange takes place with the solution by a system of pipes, such as U-shaped pipes, which also contain the temperature interchangers, and to cause the circulation by heating the solution in the rising leg of the U-shaped pipe, which conveys the solution, for instance, into the chamber, which forms part of the higher temperature range. The heating of the solution in this leg may be continued up to the development of gas from the solution, and the gas so generated may be employed for the operation of the ejector nozzle for starting the gas circulation. In this manner the gas circulation and the liquid circulation may simultaneously be caused in a very effective manner, and the latter may be rendered so efficient, that for the chambers, in which the interchange of the working medium between gas and solution occurs, a pressure head remains.

Although in the examples given three temperature ranges were discussed between which the circulation of the entire system occurs, the improvements described are by no means limited to this assumption. On the contrary, by the existence side by side of two different evaporation temperatures or of two entirely different evaporation temperatures or temperatures of the heat discharge in the described machines, it is possible to add further temperature ranges in which a reciprocal action takes place between the absorption solution and the gas mixture, and this may under certain circumstances be of decisive importance, if, for instance, for the inclusion of the third pressure zone the normal evaporation temperature is too low, but a portion of the cold can be produced at a higher temperature. This problem arises, for instance, in refrigerating cabinets, where the cooling of the refrigerating chamber to a temperature between 2° and 4° C. suffices, but for the production of ice a temperature of at least −5° C. must be produced in the evaporator. One evaporator may then operate at −8° C. and the other at 0° C. Frequently the practical conditions are still more extreme.

If very slight temperature reductions are to be obtained or an extreme reduction of the evaporation temperature, the intended effect may be increased as desired by the addition of further pressure or partial pressure zones, as far as the properties of the absorption solutions permit this.

Various modifications and changes may be made by those skilled in the art without departing from the spirit and the scope of the invention.

I claim as my invention:

1. In an absorption machine of the character described, the process which consists in evaporating the working medium from a portion of an absorption solution of a certain concentration range into an inert gas mixture within a certain temperature range and a first partial pressure zone, and reabsorbing it from said gas mixture by another portion of said absorption solution of the same concentration range as the first portion, but within another temperature range and a second partial pressure zone, and expelling the working medium from a solution and returning it into its liquid phase in a third partial pressure zone, the second partial pressure, at which the working medium is absorbed from gas mixture, by the aforementioned solution portion of equal concentration range, being lower than the third pressure at which the working medium is expelled and returned to its liquid phase, but higher than the first partial pressure at which the working medium evaporates from the first-mentioned solution portion into the gas mixture.

2. In an absorption machine of the character described and in which heat is applied to an enriched absorption solution in a high and a low temperature range and discharged within a medium temperature range, the process which consists in evaporating the working medium from a portion of an absorption solution into a neutral gas mixture within a certain temperature range and a first partial pressure zone, and reabsorbing it from said gas mixture by another portion of said absorption solution of the same concentration range but within another temperature range and a second partial pressure zone, and expelling the working medium from a solution and returning it into its liquid phase in a third partial pressure zone, the second pressure at which the working medium is absorbed from the gas mixture by the aforementioned solution portion of equal concentration range being lower than the third pressure at which the working medium is expelled and returned to its liquid phase, but higher than the first partial pressure at which the working medium evaporates from the first-mentioned solution portion into the gas mixture, the two solution portions of equal concentration range performing a cycle of circulation in which they pass successively through the low and the medium temperature range.

3. In an absorption machine involving a cycle of generation, resorption, evaporation into an inert gas and absorption, the method of setting the gas mixture in circulation through the evaporator, the resorber and the absorber, by introducing into it working medium generated at a higher pressure.

4. In an absorption machine involving a cycle of generation, resorption, evaporation into an inert gas and absorption, the method of setting the gas mixture in circulation through the evaporator, the resorber and the absorber, by introducing working medium developed at a higher pressure into the connecting pipe between the evaporator and the resorber in a direction in which the resulting motion of the gas mixture occurs in the direction from the evaporator toward the resorber.

5. In an absorption process involving operating stages of gas generation, resorption, evaporation into an inert gas and absorption therefrom, two separate gas mixture cycles within some of the aforementioned operating stages, and the maintenance of the pressure difference between such mixture cycles by means of hydrostatic columns.

6. In an absorption process involving operating stages of gas generation, resorption, evaporation into an inert gas and absorption therefrom, two separate gas mixture cycles within some of the aforementioned operating stages, and the maintenance of the pressure difference between such mixture cycles by means of hydrostatic columns, the same inert gas being admixed in said mixture cycles.

7. In an absorption machine containing a working medium, an absorption solution for said medium and an inert gas not absorbable by said solution, and comprising a generator for developing gaseous medium from solution of a certain concentration range, a resorber having a gas connection with said generator and containing solution of another cencentration range and in which the gaseous medium generated in said generator is absorbed, an evaporator having a liquid conduit connection with said resorber to permit the evaporation of gaseous medium in the evaporator from the solution of the second named concentration range, an absorber having gas connections with said evaporator and having means for receiving lean solution for absorbing gaseous medium delivered from said evaporator to form a solution of the first named concentration range, whereby a closed cycle of circulation of the said medium is formed, connecting pipes between said generator and said absorber for permitting the absorption solution of the first-mentioned concentration range to circulate, additional circulating pipe connections between said resorber and said evaporator permitting circulation of solution of the second named concentration range between said two vessels, the evaporation of gaseous medium from absorption solution of the second named concentration range and the absorption of gaseous medium into absorption solution of the first named concentration range occurring in the presence of the said inert gas into which the medium evaporates in said evaporator and from which it separates in said absorber, whereby the development of gaseous medium from absorption solution of at least a portion of one of the two solutions of different concentration range occurs in the presence of inert gas within a certain temperature range and in a certain zone of the partial pressure of said medium in mixture with said inert gas, and whereby the absorption of the gaseous medium in absorption solution of at least one part of the solution of the same concentration range, following said development of gaseous medium, occurs likewise in the presence of inert gas but within another temperature range and another partial pressure zone of said medium, the gaseous medium developed from absorption solution in the generator being under a vapor pressure higher than the pressure in said two partial pressure zones.

8. In an absorption machine containing a working medium, an absorption solution for said medium and an inert gas not absorbable by said solution, and comprising a generator for developing gaseous medium from solution of a certain concentration range, a resorber having a gas connection with said generator and containing solution of another concentration range and in which the gaseous medium generated in said generator is absorbed, an evaporator having a liquid conduit connection with said resorber to permit the evaporation of gaseous medium in the evaporator from solution of the second named concentration range, an absorber having gas connections with said evaporator and having means for receiving lean solution for absorbing gaseous medium delivered from said evaporator to form a solution of the first named concentration range, whereby a closed cycle of circulation of said medium is formed, connecting pipes between said generator and said absorber for permitting the absorption solution of the first-mentioned concentration range to circulate, additional circulating pipe connections between said resorber and said evaporator permitting circulation of solution of the second named concentration range between said two vessels, the evaporation of gaseous medium from absorption solution of the second named concentration range and the absorption of gaseous medium into absorption solution of the first-mentioned concentration range occurring in the presence of said inert gas into which the medium evaporates in said evaporator and from which it separates in said absorber, whereby the development of gaseous medium from absorption solution of at least a portion of one of the two solutions of different concentration range occurs in the presence of inert gas within a certain temperature range and in a certain zone of the partial pressure of said medium in mixture with said inert gas, and whereby the absorption of the gaseous medium in absorption solution of at least one part of the solution of the same concentration range, following said development of gaseous medium, occurs likewise in the presence of inert gas but within another temperature range and another partial pressure zone of said medium, the development of gaseous medium from absorption solution of the first concentration range and its subsequent return to its liquid phase occurring at temperatures other than those prevailing in said aforementioned two temperature ranges.

9. In an absorption machine containing a working medium, an absorption solution for said medium and an inert gas not absorbable by said solution, and comprising a generator for developing gaseous medium from solution of a certain concentration range, a resorber divided into two separate sections and connected by liquid conduits and containing in both sections a solution of another concentration range, a gas connection between said generator and the first resorber section for delivering the generated gas to the latter to be absorbed by the second range solution contained therein, an evaporator having a liquid circulating conduit connection with both sections of said resorber to permit evaporation of gaseous medium in the evaporator from the solution delivered to it from the first resorber section, a gas connection between said evaporator and the second resorber section to permit the absorption in the latter of some of the gaseous medium evaporated in the evaporator, an absorber having gas connections with said evaporator and having means for receiving lean solution for absorbing the remainder of the gaseous medium delivered from said evaporator to form a solution of the first named concentration range, whereby a closed cycle of circulation of said medium is formed, connecting pipes between said generator and said absorber for permitting solution of the first-mentioned concentration range to circulate between the generator and the absorber, the evaporation of said medium in the evaporator and its absorption in said absorber occurring into, respectively out of said inert gas, and the absorption of the gaseous medium occurring in at least one of said resorber sections also in the presence of inert gas.

10. In an absorption machine containing a working medium, an absorption solution for said medium and an inert gas not absorbable by said solution, and comprising a generator for developing gaseous medium from solution of a certain concentration range, a resorber divided into two separate sections and connected by liquid conduits and containing in both sections a solution of another concentration range, a gas connection between said generator and the first resorber section for delivering the generated gas to the latter to be absorbed by the second range solution contained therein, an evaporator having a liquid circulating conduit connection with both sections of said resorber to permit evaporation of gaseous medium in the evaporator from the solution delivered to it from the first resorber section, a gas connection between said evaporator and the second resorber section to permit the absorption in the latter of some of the gaseous medium evaporated in the evaporator, an absorber having gas connections with said evaporator and having means for receiving lean solution for absorbing the remainder of the gaseous medium delivered from said evaporator to form a solution of the first named concentration range, whereby a closed cycle of circulation of said medium is formed, connecting pipes between said generator and said absorber for permitting solution of the first-mentioned concentration range to circulate between the generator and the absorber, the evaporation of said medium in the evaporator and its absorption in said absorber occurring into, respectively out of said inert gas, and the absorption of the gaseous medium occurring in at least one of said resorber sections also in the presence of inert gas, and gas conduit connections between said second resorber section and at least one of the other vessels in which absorption solutions come in contact with said inert gas, for permitting circulation of the inert gas through said vessels.

11. In an absorption machine containing a working medium, an absorption solution for said medium and an inert gas not absorbable by said solution, and comprising a generator for developing gaseous medium from solution of a certain concentration range, a resorber divided into two separate sections and connected by liquid conduits and containing in both sections a solution of another concentration range, a gas connection between said generator and the first resorber section for delivering the generated gas to the latter to be absorbed by the second range solution contained therein, an evaporator having a liquid circulating conduit connection with both sections of said resorber to permit evaporation of gaseous medium in the evaporator from the solution delivered to it from the first resorber section, a gas connection between said evaporator and the second resorber section to permit the absorption in the latter of some of the gaseous medium evaporated in the evaporator, an absorber having gas connections with said evaporator and having means for receiving lean solution for absorbing the remainder of the gaseous medium delivered from said evaporator to form a solution of the first named concentration range, whereby a closed cycle of circulation of said medium is formed, connecting pipes between said generator and said absorber for permitting solution of the first-mentioned concentration range to circulate between the generator and the absorber, the evaporation of said medium in the evaporator and its absorption in said absorber occurring into, respectively out of said inert gas, and the absorption of the gaseous medium occurring in at least one of said resorber sections also in the presence of inert gas, and gas conduit connections between the resorber section containing inert gas and some of the other vessels, including the evaporator, in which absorption solutions come in contact with said inert gas, for permitting circulation of the inert gas through said resorber section and the evaporator.

12. In an absorption machine containing a working medium, an absorption solution for said medium and an inert gas not absorbable by said solution, and comprising a generator for developing gaseous medium from solution of a certain concentration range, a resorber divided into two separate sections and connected by liquid conduits and containing in both sections a solution of another concentration range, a gas connection between said generator and the first resorber section for delivering the generated gas to the latter to be absorbed by the second range solution contained therein, an evaporator having a liquid circulating conduit connection with both sections of said resorber to permit evaporation of gaseous medium in the evaporator from the solution delivered to it from the first resorber section, a gas connection between said evaporator and the second resorber section to permit the absorption in the latter of some of the gaseous medium evaporated in the evaporator, an absorber having gas connections with said evaporator and having means for receiving lean solution for absorbing the remainder of the gaseous medium delivered from said evaporator to form a solution of the first named concentration range, whereby a closed cycle of circulation of said medium is formed, connecting pipes between said generator and said absorber for permitting solution of the first-mentioned concentration range to circulate between the generator and the absorber, the evaporation of said medium in the evaporator and its absorption in said absorber occurring into, respectively out of said inert gas, and the absorption of the gaseous medium occurring in said second resorber section also in the presence of inert gas, and gas conduit connections between said second resorber section and said evaporator and said absorber for permitting circulation of the inert gas through said vessels, the absorption in the first absorber section by solution of the second named concentration range occurring in the absence of inert gas.

13. In an absorption machine containing a working medium, an absorption solution for said medium and an inert gas not absorbable by said solution, and comprising a generator for developing gaseous medium from solution of a certain concentration range, a resorber divided into two separate sections and connected by liquid conduits and containing in both sections a solution of another concentration range, a gas connection between said generator and the first resorber section for delivering the generated gas to the latter to be absorbed by the second range solution contained therein, an evaporator having a liquid circulating conduit connection with both sections of said resorber to permit evaporation of gaseous medium in the evaporator from the solution delivered to it from the first resorber section, a gas connection between said evaporator and the second resorber section to permit the absorption in the latter of some of the gaseous medium evaporated in the evaporator, an absorber having gas connections with said evaporator and having means for receiving lean solution for absorbing the remainder of the gaseous medium delivered from said evaporator to form a solution of the first named concentration range, whereby a closed cycle of circulation of said medium is formed, connecting pipes between said generator and said absorber for permitting solution of the first-mentioned concentration range to circulate between the generator and the absorber, the evaporation of said medium in the evaporator and its absorption in said absorber occurring into, respectively out of said inert gas, and the absorption of the gaseous medium occurring in at least one of said resorber sections also in the presence of inert gas, and gas conduit connections between the resorber section containing inert gas and some of the other vessels, including the evaporator, in which absorption solutions come in contact with said inert gas, for permitting circulation of the inert gas through said resorber section and the evaporator, and means for effecting the circulation of said inert gas.

14. In an absorption machine containing a working medium, an absorption solution for said medium and an inert gas not absorbable by said solution, and comprising a generator for developing gaseous medium from solution of a certain concentration range, a resorber divided into two separate sections and connected by liquid conduits and containing in both sections a solution of another concentration range, a gas connection between said generator and the first resorber section for delivering the generated gas to the latter to be absorbed by the second range solution contained therein, an evaporator having a liquid circulating conduit connection with both sections of said resorber to permit evaporation of gaseous medium in the evaporator from the solution delivered to it from the first resorber section, a gas connection between said evaporator and the second resorber section to permit the absorption in the latter of some of the gaseous medium evaporated in the evaporator, an absorber having gas connections with said evaporator and having means for receiving lean solution for absorbing the remainder of gaseous medium delivered from said evaporator to form a solution of the first named concentration range, whereby a closed cycle of circulation of said medium is formed, connecting pipes between said generator and said absorber for permitting solution of the first-mentioned concentration range to circulate between the generator and the absorber, the evaporation of said medium in the evaporator and its absorption in said absorber occurring into, respectively out of said inert gas, and the absorption of the gaseous medium occurring in at least one of said resorber sections also in the presence of inert gas, and gas conduit connections between the resorber section containing inert gas and some of the other vessels, including the evaporator, in which absorption solutions come in contact with said inert gas, for permitting circulation of the inert gas through said resorber section and the evaporator, and means for effecting the circulation of said inert gas, comprising a gaseous medium supply line carrying a pressure higher than that in the circuit carrying the inert gas, said supply line having a nozzle terminating in one of the gas mixture conduits for setting the gas mixture in motion.

15. In an absorption machine containing a working medium, an absorption solution for said medium and an inert gas not absorbable by said solution, and comprising a generator for developing gaseous medium from solution of a certain concentration range, a resorber divided into two separate sections and connected by liquid conduits and containing in both sections a solution of another concentration range, a gas connection between said generator and the first resorber section for delivering the generated gas to the latter to be absorbed by the second range solution contained therein, an evaporator having a liquid circulating conduit connection with both sections of said resorber to permit evaporation of gaseous medium in the evaporator from the solution delivered to it from the first resorber section, a gas connection between said evaporator and the second resorber section to permit the absorption in the latter of some of the gaseous medium evaporated in the evaporator, an absorber having gas connections with said evaporator and having means for receiving lean solution for absorbing the remainder of the gaseous medium delivered from said evaporator to form a solution of the first named concentration range, whereby a closed cycle of circulation of said medium is formed, connecting pipes between said generator and said absorber for permitting solution of the first-mentioned concentration range to circulate between the generator and the absorber, the evaporation of said medium in the evaporator and its absorption in said absorber occurring into, respectively out of said inert gas, and the absorption of the gaseous medium occurring in at least one of said resorber sections also in the presence of inert gas, and gas conduit connections between the resorber section containing inert gas and some of the other vessels, including the evaporator, in which absorption solutions come in contact with said inert gas, for permitting circulation of the inert gas through said resorber section and the evaporator, and a pipe connection for conducting pure gaseous medium developed by said generator, at a pressure and temperature higher than those prevailing in the gas mixture circuit, into said mixture circuit, said pipe connection having a nozzle terminating in one of said gas mixture conduits for setting the gas mixture in motion.

16. In an absorption machine containing a working medium, an absorption solution for said medium and an inert gas not absorbable by said solution, and comprising a generator for developing gaseous medium from solution of a certain concentration range, a resorber divided into two separate sections and connected by liquid conduits and containing in both sections a solution of another concentration range, a gas connection between said generator and the first resorber section for delivering the generated gas to the latter to be absorbed by the second range solution contained therein, an evaporator having a liquid circulating conduit connection with both sections of said resorber to permit evaporation of gaseous medium in the evaporator from the solution delivered to it from the first resorber section, a gas connection between said evaporator and the second resorber section to permit the absorption in the latter of some of the gaseous medium evaporated in the evaporator, an absorber having gas connections with said evaporator and having means for receiving lean solution for absorbing the remainder of the gaseous medium delivered from said evaporator to form a solution of the first named concentration range, whereby a closed cycle of circulation of said medium is formed, connecting pipes between said generator and said absorber for permitting solution of the first-mentioned concentration range to circulate between the generator and the absorber, the evaporation of said medium in the evaporator and its absorption in said absorber occurring into, respectively out of said inert gas, and the absorption of the gaseous medium occurring in at least one of said resorber sections also in the presence of inert gas, and gas conduit connections between the resorber section containing inert gas and some of the other vessels, including the evaporator, in which absorption solutions come in contact with said inert gas, for permitting circulation of the inert gas through said resorber section and the evaporator, and a pipe connection for conducting pure gaseous medium developed by said generator, at a pressure and temperature higher than those prevailing in the gas mixture circuit, into said mixture circuit, said pipe connection having a nozzle terminating in the gas mixture conduit at the point where the mixture emanates from the evaporator, whereby the gas mixture is set in motion in the direction toward the second resorber section and the pure gas supplied by said pipe is admixed to the gas mixture and returned into the cycle of the operating medium through the evaporator and the two resorber sections, and the absorber.

17. In an absorption process involving operating stages of gas generation, resorption, evaporation into an inert gas and absorption therefrom, two separate gas mixture cycles within some of the aforementioned operating stages, one of said mixture cycles including the evaporation stage and the absorption stage, and the other gas mixture cycle including the resorption stage and one of the other operating stages.

18. In an absorption process involving operating stages of gas generation, resorption, evaporation into an inert gas and absorption therefrom, two separate gas mixture cycles within some of the aforementioned operating stages, one of said mixture cycles including the evaporation stage and the absorption stage, and the other gas mixture cycle including the resorption stage and one of the other operating stages, each of the mixtures in the two gas mixture cycles containing a different inert gas.

19. In an absorption machine involving a cycle of the working medium through a generation stage, a resorption stage, an evaporation stage and absorption stage, a cycle of absorption liquid through said resorption stage and said evaporation stage and a cycle of an inert gas through said resorption stage and at least one of the working medium developing stages; the stage of the process which consists in circulating the gas mixture during the resorption stage in counterflow to the absorption liquid.

20. In an absorption machine containing a working medium, an absorption solution for said medium and an inert gas not absorbable by said solution, and comprising a generator for developing gaseous medium from solution of a certain concentration range, a resorber divided into two separate sections connected by liquid conduits and containing in both sections a solution of another concentration range, a gas connection between said generator and the first resorber section for delivering the generated gas to the latter to be absorbed by the second range solution contained therein, an evaporator having a liquid circulating conduit connection with both sections of said resorber to permit evaporation of gaseous medium in the evaporator from the solution delivered to it from the first resorber section, a gas connection between said generator and an ascending part of said liquid circulating conduit, to permit the lifting of said second range solution to said first-named resorber section by means of gas bubbles developed in said generator, an absorber having gas connections with said evaporator and having means for receiving lean solution for absorbing the gaseous medium delivered from said evaporator to form a solution of the first-named concentration range, whereby a closed cycle of circulation of said medium is formed, connecting pipes between said generator and said absorber for permitting solution of the first-mentioned concentration range to circulate between the generator and the absorber, the evaporation of said medium in said evaporator and its absorption in said absorber occurring into, respectively out of said inert gas, and the absorption of the gaseous medium occurring in the second-named resorber section also in the presence of inert gas.

21. In an absorption machine of the character described, the process which consists in evaporating the working medium from a portion of an absorption solution of a certain concentration range into an inert gas mixture within a certain temperature range and a first partial pressure zone, and reabsorbing it from said gas mixture by another portion of said absorption solution of the same concentration range as the first portion, but within another temperature range and a second partial pressure zone, and expelling the working medium from a solution and returning it into its liquid phase in a third partial pressure zone and within a third temperature range, the second partial pressure, at which the working medium is absorbed from gas mixture by the aforementioned solution portion of equal concentration range, being lower than the third pressure at which the working medium is expelled and returned to its liquid phase, but higher than the first partial pressure at which the working medium evaporates from the first-mentioned solution portion into the gas mixture.

In testimony whereof I affix my signature.

EDMUND ALTENKIRCH.